United States Patent Office 3,509,097
Patented Apr. 28, 1970

3,509,097
NOVEL RESINOUS POLYQUINOXALINE POLYMERS AND PROCESS FOR PREPARING THE SAME
John M. Hoyt and Karl Koch, Cincinnati, Ohio, assignors to National Distillers and Chemical Corporation, New York, N.Y., a corporation of Virginia
No Drawing. Filed Dec. 28, 1966, Ser. No. 605,202
Int. Cl. C08g 15/00, 9/06
U.S. Cl. 260—65                                9 Claims

ABSTRACT OF THE DISCLOSURE

Resinous polyquinoxalines of high heat stability useful as protective coatings and laminating resins where extreme resistance to heat is required are prepared as follows: (1) an aromatic dialdehyde is reduced at about 0–80° C. to a poly[arylene-bis(hydroxymethylene)]; this is (2) treated with nitric acid at above ambient temperature to yield a poly(arylenedicarbonyl) polymer which is (3) polycondensed with o-phenylenediamine and/or 3,3',4,4'-tetraaminobiphenyl.

---

This invention relates to novel thermosetting resins, more particularly to heat-resistant polyquinoxalines, and to processes for preparing same.

It is known that polymers whose recurring units consist of aromatic carbocyclic rings exhibit excellent heat stability. For example, polyphenylene, in which the recurring units are 1,4-phenylene nuclei, retains 82 percent of its weight upon heating to 800° C. in a thermogravimetric analysis determination under nitrogen (Dunnavant, Plastics Design and Process, 6, 11 (1966)). Despite its great heat stability, however, polyphenylene is a relatively intractable substance not easily fabricated by conventional methods.

Similar excellent heat stability is also found for polyaromatic polymers the recurring units of which are heterocyclic rings or combinations of aromatic carbocyclic and aromatic heterocyclic rings, e.g., polybenzimidazoles, prepared by condensing aromatic tetraamines with aromatic diesters, and polyquinoxalines. For example, poly[2,2'-(1,3-phenylene)-6,6'-diquinoxaline], obtained by the polycondensation of 1,3-phenylenediglyoxal and 3,3',4,4'-tetraaminobiphenyl, is stable up to 600° C. under nitrogen (Stille, Williamson, and Arnold, J. Polymer Sci. A, 3:1013 (1965)). Other polyquinoxalines have been reported in which the aromatic nuclei are bridged by oxy-, thio-, and sulfonyl linkages, for example, poly[2,2'-(oxydiphenylene)-6,6'-oxydiquinoxaline], prepared by the condensation of 4,4'-oxydiphenylenediglyoxal and 3,3',4,4'-tetraaminodiphenyl ether (Stille and Arnold, J. Polymer Sci. A–1, 4:551 (1966)).

The starting materials required for the preparation of the polyquinoxalines of the art, e.g., the aromatic bisglyoxals, are often very difficultly accessible compounds requiring numerous steps and the use of relatively expensive reagents for their synthesis.

In the polyquinoxalines of the art the polymer chains can be considered linear because the aromatic tetraamine and aromatic bisglyoxal starting materials are actually bifunctional with respect to polyquinoxaline formation. To introduce variable amounts of crosslinking by three-dimensional polyquinoxaline formation, and thus to realize such desirable properties as improved resistance to solvents, mechanical deformation, and heat which are expected from crosslinked materials, it would be necessary to synthesize starting materials of still higher functionality, e.g., aromatic hexaamines and aromatic trisglyoxals, a task of even greater complexity than the synthesis of the aforesaid aromatic tetraamines and bisglyoxals required to prepare the linear polyquinoxalines of the art.

Furthermore, in the polyquinoxalines of the art, the quinoxaline recurring unit is relatively symmetrically disposed about the long axis of the polymer chain, as in the 2,2'-(phenylene)-6,6'-diquinoxaline and related recurring units. Such symmetrical disposition is believed to favor high softening point and brittleness in the final polymer.

It is, therefore, an object of this invention to provide a method for preparing polyquinoxalines from relatively readily available starting materials.

Another object of this invention is to provide a method for preparing polyquinoxalines having variable amounts of crosslinking, thus making readily available finished products that have improved heat-stability, resistance to solvents, and resistance to deformation.

A further object of this invention is to prepare polyquinoxalines in which the quinoxaline recurring units are relatively unsymmetrically disposed about the long axis of the polymer chain, resulting in products having lowered softening point and increased flexibility, while retaining the heat stability of the quinoxaline nucleus.

These and other objects of the present invention will become apparent from the ensuing description and illustrative embodiments.

It has now been found that polyquinoxalines can be prepared by a stepwise process as follows: (1) an aromatic dialdehyde is reduced at about 0° to 80° C. to a poly[arylene-bis(hydroxymethylene)]; this is (2) treated with nitric acid at a temperature above ambient temperature to yield a poly(arylenedicarbonyl) polymer which is (3) polycondensed with o-phenylenediamine and/or 3,3',4,4'-tetraaminobiphenyl to yield the desired polyquinoxaline.

The process is illustrated by the following equations:

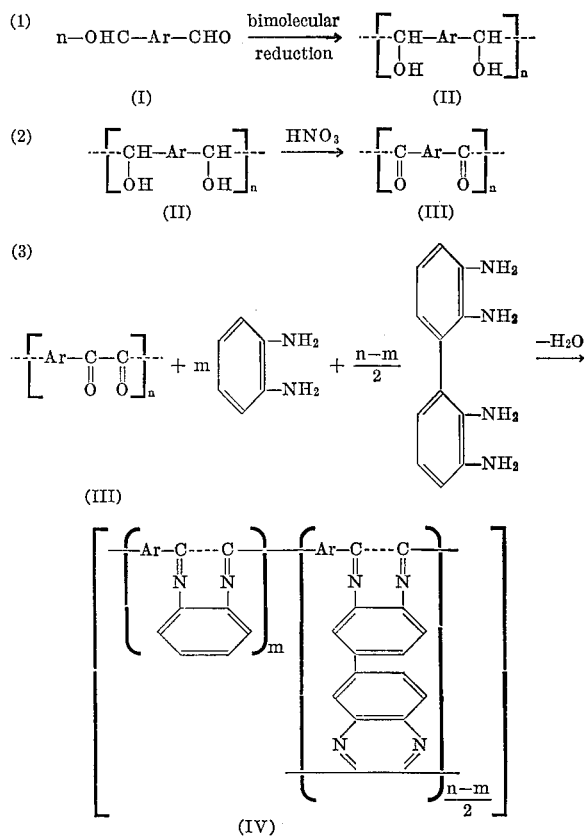

in which Ar is an aromatic diradical, $n$ is a positive integer equal to or greater than 3, $m$ is a positive integer ranging from 0 to $n$, and in which it is understood that the recurring units of (IV) may be more or less randomly distributed.

In the initial step of the process of this invention, the aromatic dialdehyde (I) (Equation 1) dissolved in a suitable water-miscible organic solvent is rapidly added under an oxygen-free atmosphere to a reducing agent at a temperature within the range of about 0° to 80° C. After several hours' reaction at a temperature between about 0° and 80° C., the product, a poly[arylene-bis(hydroxymethylene)] (II), is isolated by diluting the reaction mixture, filtering, and drying.

In the second step of the process (Equation 2), the poly[arylene-bis(hydroxymethylene)] (II), is isolated by diluting the reaction mixture, filtering, and drying.

In the second step of the process (Equation 2), the poly[arylene-bis(hydroxymethylene)] (II) is gradually added to concentrated nitric acid (about 70 percent) at a temperature above about 50° C. and thereafter refluxed for several hours until the evolution of nitrogen oxides ceases. The poly(arylenedicarbonyl) polymer (III) produced is isolated by diluting with water, filtering, and drying.

In the final step of the process (Equation 3), the poly(arylenedicarbonyl) product (III) is reacted with a mixture of o-phenylenediamine and 3,3',4,4'-tetraaminobiphenyl to yield the desired polyquinoxaline (IV).

Alternatively, either the o-phenylenediamine or the 3,3',4,4'-tetraaminobiphenyl can be omitted entirely. If the o-phenylenediamine is omitted, the product has a highly cross-linked structure; if the 3,3',4,4'-tetraaminobiphenyl is omitted, the product is a linear poly[2,3-(arylene)quinoxaline]. When both o-phenylenediamine and 3,3',4,4'-tetraaminobiphenyl are used, the product is more or less crosslinked, depending upon the amount of 3,3',4,4'-tetraaminobiphenyl used in the mixture.

The polycondensation step (Equation 3) may be carried out in a solvent comprising an excess of a molten mixture of o-phenylenediamine and 3,3',4,4'-tetraaminobiphenyl, or a dipolar aprotic solvent such as hexamethylphosphoric triamide may be employed as the reaction solvent.

It is preferred to carry out the polyquinoxaline polycondensation of Equation 3 in situ on a suitable substrate, e.g., on glass fibers, glass cloth, carbon, a metal, or the like, which is to be coated or laminated with the polyquinoxaline.

In the preferred embodiment of the polyquinoxaline-forming procedure, an intimate solid mixture of the poly(arylenedicarbonyl) III, o-phenylenediamine, and 3,3',4,4'-tetraaminobiphenyl, in which the aromatic amines are taken in excess, is distributed evenly onto the heated surface to be coated or laminated, the temperature being sufficient to fuse the aromatic amine mixture, i.e., about 125° to 200° C. As the aromatic amine mixture melts, the poly(arylenedicarbonyl) polymer dissolves therein and rapidly forms the polyquinoxalines (IV). Thereafter the temperature of the surface is increased to about 200° to 350° C. to force the reaction to completion and to volatilize the aromatic amines, which are recovered and recycled. In order to prevent oxidation of the aromatic amines, the entire operation is carried out in an oxygen-free atmosphere.

In another embodiment of the polyquinoxaline-forming process of this invention, a solution of the poly(arylenedicarbonyl) III is hexamethylphosphoric triamide is mixed with a mixture of o-phenylenediamine and 3,3',4,4'-tetraamininobiphenyl immediately prior to being coated onto the heated substrate. The coating is heated further to effect polycondensation, remove the hexamethylphosphoric triamide solvent, drive the quinoxaline reaction to completion, and remove any excess aromatic amines.

The preferred aromatic dialdehyde (I) is terephthaldehyde, although other dialdehydes may be used, such as isophthaldehyde, 1,4-naphthalenedicarboxaldehyde, 2,5-pyridinedicarboxaldehyde, and the like, and mixtures thereof.

The aromatic dialdehyde is dissolved in a water-miscible organic solvent before being added, in the preferred embodiment, to an aqueous chromous sulfate coupling agent. Water-miscible solvents such as dioxane, acetone, methanol, ethanol, dimethylacetamide, dimethylformamide, and the like, and mixtures of these may be used, with dioxane being preferred.

The preferred coupling agent for the bimolecular reduction reaction of Equation 1 is aqueous chromous sulfate; it is, however, possible to use other reducing agents such as acidic aqueous vanadous sulfate, magnesium amalgam in alcohol, sodium in alcohol, and the like.

The oxidation of Equation 2 is preferably carried out with concentrated nitric acid containing about 70 percent by weight $HNO_3$.

In the bimolecular reduction step (Equation 1) the aromatic dialdehyde is dissolved in a water-miscible organic solvent, the concentration of the dialdehyde in the solvent varying from about 5 to about 20 percent by weight, with a concentration of about 8 to 12 percent being preferred. The dialdehyde in the solvent is added to the reducing agent over a time-interval of about 10 seconds to 2 hours, an interval of 1 to 5 minutes being preferred.

The preferred reducing agent is chromous sulfate solution; this may be prepared by any known and convenient method, e.g., by the reduction of chromic sulfate with zinc, the reduction of chromic sulfate with chromium, or the reaction of pure metallic chromium with sulfuric acid. The concentration of the chromous sulfate can range from about 0.1 to 2 molar, and concentrations of about 0.5 to 1.2 molar are preferred.

The coupling reaction of Equation 1 must be carried out under and inert atmosphere, for example, under nitrogen, argon, helium, carbon dioxide, or the like, to prevent oxidation of the reducing agent. The addition of the aromatic dialdehyde and the entire coupling reaction are carried out at a temperature within the range of about 0° to 80° C., and a temperature of about 0° to 20° C. is preferred. The reaction time may range from about 15 minutes to 8 hours; 2 to 4 hours is preferred. The reaction takes place under conditions of good agitation and at autogenous pressures.

The oxidation reaction of step 2 (Equation 2) is accomplished by gradually adding finely-divided poly[arylene-bis(hydroxymethylene)] polymer (II) to nitric acid at about 50° to 70° C. and then refluxing the resulting slurry until the brown fumes of nitrogen oxides are no longer evolved. The ratio of polymer to nitric acid is broadly one part of polymer by weight to about 5 to 500 parts of nitric acid, with about 10 to 100 parts of nitric acid per part of polymer being preferred. The reaction may be carried out at any temperature between ambient temperature and reflux, but about 50° C. to reflux is preferred. The reaction may be continued for about 1 to 10 hours, 3 to 8 hours being preferred. The pressure is autogenous.

In the preferred embodiment of the polyquinoxaline-forming step (Equation 3), an intimate mixture of the poly(arylenedicarbonyl) (III), o-phenylenediamine, and 3,3',4,4'-tetraaminobiphenyl is heated to fusion of the aromatic amine mixture. The polymer (III) disssolves rapidly in the melt of the aromatic amine mixture, and eventually the desired polyquinoxaline (IV) precipitates as the polycondensation proceeds. The ratio of the three components may vary over a wide range, but in general for each equivalent of —ArCOCO— in the poly(arylenedicarbonyl) polymer (III) 0 to about 100 moles of o-phenylenediamine and 0 to about 25 moles of 3,3',4,4'-tetraaminobiphenyl may be employed, the preferred amounts being 0 to about 20 moles of o-phenylenediamine and 0 to about 10 moles of 3,3',4,4'-tetraaminobiphenyl. It is to be understood that in all cases enough of either aromatic amine, i.e., o-phenylenediamine or 3,3′,4,4′-tetraaminobiphenyl, must be taken to convert all of the α-diketone sequences to quinoxaline nuclei as indicated by Equation 3.

The polyquinoxaline-forming step of Equation 3 may be carried out over a wide range of temperatures ranging from about 50° to 400° C., temperatures of about 100° to 350° C. being preferred. The reaction time may vary from about 15 minutes to 24 hours with periods of about 30 minutes to 10 hours being preferred. It is also advantageous to heat for relatively briefer periods while gradually increasing the temperature, for example, for 30 minutes to 2 hours at 200-220° C. followed by 2 to 6 hours at 230-260° C.

The preferred solvent is an excess of the aromatic amines. It is possible, however, to use solvents selected from the group comprising dipolar aprotic solvents, such as hexamethylphosphoric triamide, N,N-dimethylacetamide, N-methyl-2-pyrrolidone, dimethylsulfone, and the like, and mixtures of these. The pressure of the reaction is autogenous, and the reaction is carried out under an oxygen-free atmosphere, e.g., nitrogen, argon, helium, and the like, to prevent oxidation of the amines.

Thus by the process of this invention novel polyquinoxalines having high thermal stability have been prepared. The compositions of this invention, because of their combination of high heat stability, solvent resistance, solubility, and resistance to deformation, are useful in applications where extreme resistance to heat is required; they are particularly useful as protective coatings and as laminating resins.

The invention will be more fully understood by reference to the following illustrative embodiments:

EXAMPLE I

Preparation of poly[1,4-phenylene-bis(hydroxymethylene)]

To a nitrogen-flushed, 1-liter, 3-necked flask fitted with a heating mantle, reflux condenser, thermometer, dropping funnel, and nitrogen supply was added 147 grams (0.222 mole) of chromium sulfate $$Cr_2(SO_4)_3 \cdot 15H_2O,$$

13.1 grams (0.200 gram atom) of 20 mesh zinc, and 450 ml. of deionized water. The mixture was heated and refluxed for 1.5 hours. Titration showed that the solution contained 360 mM. of chromous sulfate (90 percent conversion based on zinc). No residual zinc was visible.

The solution was cooled to 5° C. and to it was added at once with stirring a solution of 14.9 grams (0.111 mole) of terephthaldehyde in 155 mol of p-dioxane. Within 1 minute the temperature of the solution in the flask had increased to 17° C. but fell rapidly thereafter to the range of 1-6° C. where it was held for a period of 8 hours. After about one-half hour finely-divided solid began to precipitate. The final solution was cloudy and blue; it contained 140 mM. of unused chromous sulfate, indicating a consumption of 0.99 mole of chromous sulfate per equivalent of aldehyde function. The solution was poured into 6 liters of cold deionized water and allowed to stand overnight.

Most of the clear, supernatant liquid was siphoned off, and the remaining solid was collected by filtration, washed with water, and dried in vacuum at 60° C. to constant weight. The product was 10.64 grams (70.5 percent conversion) of a white powder with a faintly blue cast. The crude product lost only 30 mg. after extraction for six hours with acetone (Soxhlet).

Poly[1,4-phenylene-bis(hydroxymethylene] is completely soluble in hexamethylphosphoric triamide above about 80° C. In this solvent inherent viscosities in the range of 0.04 to 0.24 dl./g. (0.50 g./100 ml. at 135° C.) have been measured for individual polymers prepared by the method of this invention.

A specimen of the polymer was reprecipitated three times by dissolving it in hexamethylphosphoric triamide and pouring the solution into a suitable precipitant. Acidified water was used in the first two reprecipitations and methanol in the final one. The first reprecipitation appeared to remove most of the residual chromium contamination as judged from the light green color of the mother liquor. The final purified polymer was exhaustively extracted with acetone to remove hexamethylphosphoric triamide. Emission spectral analysis of the purified material confirmed that phosphorus was absent and indicated only a trace of chromium. The purified polymer was an off-white powder with an inherent viscosity of 0.19 (0.50 g./100 ml.) hexamethylphosphoric triamide (45 percent recovery).

*Analysis.*—Calculated for $(C_8H_8O_2)_n$ (percent): C, 70.58; H, 5.88. Found (percent): C, 69.55; H, 5.57; ash, 0.31.

The infrared absorption spectrum for the purified polymer showed strong absorption at 3400 cm.$^{-1}$ (OH stretching), 1080 cm.$^{-1}$ (OH deformation, C—O stretching), 3050 cm.$^{-1}$ (aromatic C—H stretching), 2900 cm.$^{-1}$ (aliphatic C—H stretching), and 1600 and 1505 cm.$^{-1}$ (aromatic ring). A small carbonyl band at 1680 cm.$^{-1}$ may arise from aldehyde end-groups.

The purified reprecipitated poly[1,4-phenylene-bis(hydroxymethylene)] was amorphous to X-rays.

The presence of two hydroxyl groups per repeat unit has been demonstrated for the purified polymer by acetylation in an equal volume mixture of 1:1 acetic anhydride-pyridine and hexamethylphosphoric triamide at reflux.

Calculated for 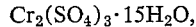 (percent): OH, 25.0. Found (percent): OH, 19.3 (30 minutes); 23.67 (2 hours).

Blank determinations established that little reaction occurred between the solvent and the acetylating mixture within the time of the determination.

EXAMPLE II

Conversion of poly[1,4-phenylene-bis(hydroxymethylene)] to poly(1,4-phenylenedicarbonyl)

2.00 grams (1.47 m-equiv.) of the poly[1,4-phenylene-bis hydroxymethylene)] ($n_{inh}$=0.19) prepared in Example I was added gradually to 70 ml. of warm (50° C.) 70 percent nitric acid over a period of 20 minutes. Copious evolution of brown fumes was observed during the addition and thereafter during the early part of a subsequent 6.5-hour period at reflux. After standing overnight, the reaction slurry was poured into 650 ml. of water. The bright yellow granular solid was collected, washed with water, and dried. The yield was 1.87 grams (96.5 percent). The material softens at about 370° C. to a brown viscous mass.

*Analysis.*—Calculated for $(C_8H_4O_2)_n$ (percent): C, 72.73; H, 3.05. Found (percent): C, 69.22; H, 3.48; N, 0.18; no ash.

The infrared absorption spectrum contains broad, strong absorption in the range of 1665–1680 cm.$^{-1}$ (C—O stretching) and strong absorption at 1195 cm.$^{-1}$ (C—O stretching), both of which can be attributed to aromatic ketone groups. A medium carbonyl band at 1710 cm.$^{-1}$ and weak but broad absorption at 2500–2700 cm.$^{-1}$ indicate the presence of carboxylic acid groups, probably as end groups. No hydroxyl absorption is noted.

If it is assumed that the polymer chains are terminated on each end by a carboxylic acid end group, the elemental analysis is in good agreement with the structure HOOC—Ar—CO—(—CO—Ar—CO)$_3$—COArCOOH Ar representing the 1,4-phenylene diradical (theoretical: 69.2 percent of C; 3.17 percent of H.

The polymer is soluble in hexamethylphosphoric triamide and in o-phenylenediamine. It is also soluble in concentrated sulfuric acid and partially soluble in pyridine.

Oxidative degradation of poly(1.4 - phenylenedicarboxyl) with potassium dichromate in sulfuric acid yielded terephthalic acid. Pyrolysis in vacuum at 550° C. gave CO and $CO_2$ in a mole ratio of 11.5 to 1.

EXAMPLE III

Preparation of a polyquinoxaline from poly(1,4-phenylenedicarbonyl) and o-phenylenediamine A mixture of 1.11 grams (8.4 m-equiv.) of poly(1,4-phenylenedicarbonyl) (prepared in Example II) and 8.0 grams (74 mM.) of twice-sublimed o-phenylenediamaine was heated under nitrogen at 125–155° C. for six and three-quarters hours. After cooling, the solid product was collected in a filter, washed repeatedly with boiling methanol, and dried. The product was 1.26 grams (73.5 percent conversion) of a novel polyquinoxaline, obtained as a buff solid softening at 308–315° C.

The polyymer was substantially soluble (96 percent in hot hexamethylphosphoric triamide. The infrared absorption spectrum contains bands at 760 cm.$^{-1}$ (o-disubstituted aromatic nucleus) and 840 cm.$^{-1}$ (p-disubstituted aromatic nucleus). No change in location and intensity of these bands was noted after the polymer had been reprecipitated three times from hexamethylphosphoric triamide, indicating the presence of structural elements derived from both poly(1,4-phenylenedicarbonyl) and o-phenylenediamine. The spectrum further contains bands at 1470, 1445, 1335, 1060, 1013, and 975 cm.$^{-1}$, which compare with similar bands at 1480, 1444, 1347, 1071, and 1059, 023, and 977 cm.$^{-1}$, respectively, in the spectrum of the known model substance 2,3-diphenylquinoxaline obtained by reacting benzil with o-phenylenediamine.

The elemental analysis of the polymer is in fair agreement with the structure HOOC—Ar(—Q—Ar)$_6$—COOH, wherein Ar is in the 1,4-phenylene diradical and Q is the 2,3-quinoxaline diradical.

*Analysis.*—Caluclated (percent): C, 79.43; H, 3.88; N, 12.09. Found (percent): C, 78.57; H, 4.47; N, 12.26.

The thermogravimetric analysis of reprecipitated polymer showed that some breakdown occurs at about 300° C. and at 550° C., with a 72 percent residue being observed at 900° C. ($N_2$, 150° C./min.)

EXAMPLE IV

Preparation of polyquinoxalines from poly(1,4-arylenedicarbonyl) and mixtures of o-phenylenediamine and 3,3',4,4'-tetraaminobiphenyl (A) Mole ratio of 1:4.4:0.40 poly(1,4-phenylenedicarbonyl: o-phenylenediamine: 3,3',4,4'-tetraaminobiphenyl (11:1 ratio of diamine to tetraamine)

An intimate mixture of 1.50 grams (11.4 m-equiv.) of the poly(1,4-phenylenedicarbonyl) prepared in Example II, 5.40 grams (50 mM.) of o-phenylenediamine, and 0.609 gram (2.84 mM.) of 3,3',4,4'-tetraaminobiphenyl in a sidearm test tube under nitrogen was placed in a 200° C. oil bath. A dark red brown turbid liquid was produced. Heating was carried out for 1 hour at 200° C. and then for 1 hour at 240° C. The reaction mixture was cooled and precipitated with methanol. The solid was collected, washed with methanol, transferred to the Soxhlet extraction apparatus, and extracted with methanol, acetone, and finally methanol until no further color appeared in the extract (4-days extraction). After drying, 1.288 grams (55 percent) of a novel polyquinoxaline was obtained as brownish yellow solid having a softening point of 328–334° C.

*Analysis.*—Calculated for the structure of the product of Example III (percent): C, 79.43; H, 3.88; N, 12.09; O, 4.60. Found (percent): C, 77.73; H, 4.35; N, 13.11; O, 3.49; no ash.

The infrared spectrum was similar to that described for polyquinoxaline of Example III.

(B) Mole ratio of 1.00:8.23::0.101 poly(1,4-phenylenedicarbonyl): o phenylenediamine: 3,3',4,4'-tetraaminobiphenyl (81.5:1 ratio of diamine to tetraamine)

An intimate mixture of 1.500 grams (11.4 m-equiv.) of poly(1,4-phenylenedicarbonyl) (prepared in Example II), 10.057 grams (93.5 mM.) of o-phenylenediamine, and 0.246 gram (1.15 mM.) of 3,3',4,4'-tetraaminobiphenyl in a glass tube under nitrogen was heated for 30 minutes at 200° C. and then for 60 minutes at 240° C. The product was isolated as described in part (A) above; 1.425 grams (61.5 percent) of a polyquinoxaline was obtained as a brownish yellow solid softening at 342–344° C.

*Analysis.*—Calculated for the structure of the product of Example III (percent): C, 79.43; H, 3.88; N, 12.09; O, 4.60. Found (percent): C, 73.24; H, 5.10; N, 13.34; O, 4.71; no ash.

The infrared spectrum of the polymer compares favorably with that of the polymer of part (A) above.

EXAMPLE V

Preparation of a polyquinoxaline from poly(1,4-phenylenedicarbonyl) and 3,3',4,4'-tetraaminobiphenyl By the procedure set forth in Examples III and IV, a mixture of 1.32 grams (10 m-equiv.) of poly(1,4-phenylenedicarbonyl) (prepared in Example II) and 9.83 grams (48.0 mM.) of 3,3',4,4'-tetraaminobiphenyl was heated for 30 minutes at 200°–210° C. and then for 2.5 hours at 240–250° C. The polymer, 2.473 grams of a novel polyquinoxaline was obtained as a brown solid darkening slightly at 390–400° C. and not melting up to 500° C., it was recovered as in Examples III and IV.

On a steel spatula in a free flame little burning was observed. The specimen glowed at red heat and appeared to have a residue of 60–80 percent of the original amount (estimated visually).

*Analysis.*—Calculated for the structure of the product of Example III (percent): C, 79.43; H, 3.88; N, 12.09; O, 4.60. Found (percent): C, 73.24; H, 5.19; N, 13.34; O, 5.05; no ash.

The infrared absorption spectrum resembled those of the polyquinoxalines made in Examples III and IV.

Thermogravimetric analysis ($N_2$, 150° C./hr.) of the polymer showed incipient breakdown at 260° C., but the weight loss was only 5 percent at 500° C. The 900° C. residue was 76 percent.

EXAMPLE VI

An intimate mixture of 13.2 grams (100 m-equiv.) of poly(1,4-phenylenedicarbonyl) (prepared as in Example II) and 98.3 grams (0.48 mole) of 3,3',4,4'-tetraaminobiphenyl was prepared, and then a sufficient amount of the mixture was spread evenly to a depth of about 5 mm. to cover a part of the area of a strip of glass cloth about 4 inches wide and 6 inches long. The coated strip was placed on a metal pan and introduced into a nitrogen-filled heating chamber held at 210–220° C. for 30 minutes. The temperature was increased to 250° C. and held for 3 hours, whereupon the chamber was evacuated and heated at 250–300° C. to volatilize the unreacted tetraamine. After cooling, the strip of glass cloth was removed and found to be coated with an adherent brown coating which showed little change on heating to 500° C.

While particular embodiments of this invention are shown above, it will be understood that the invention is obviously subject to variations and modifications without departing from its broader aspects.

What is claimed is:

1. Resinous polyquinoxaline compositions consisting of recurring units of the following structural formula

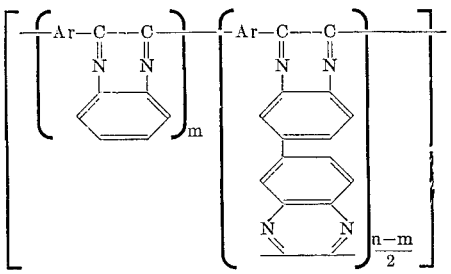

wherein Ar is an aromatic diradical, $n$ is a positive integer equal to or greater than 3, $m$ is a positive integer ranging from 0 to $n$, and in which the recurring units are randomly distributed.

2. The composition of claim 1 in which $m=0$.
3. The composition of claim 1 in which $m=n$.
4. A process for the preparation of resinous polyquinoxalines consisting of recurring units of the following structural formula

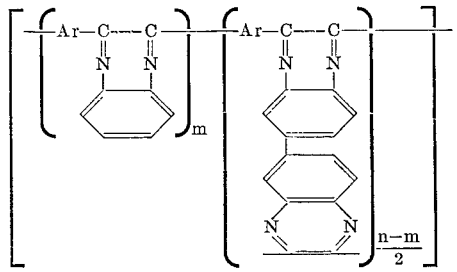

wherein Ar is an aromatic diradical, $n$ is a positive integer equal to or greater than 3, $m$ is a positive integer ranging from 0 to $n$, and in which the recurring units are randomly distributed which comprises the steps of (1) reducing an aromatic dialdehyde in an oxygen-free atmosphere at a temperature of about 0° to 80° C. to a poly-[arylene-bis(hydroxymethylene)] having the structure

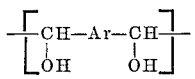

wherein Ar is an aromatic diradical; (2) treating the poly-[arylene-bis(hydroxymethylene)] with nitric acid at above ambient temperature to produce a poly(arylenedicarbonyl) polymer having the structure

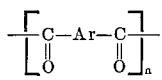

in which Ar is an aromatic diradical and $n$ is a positive integer equal to or greater than 3; and (3) polycondensing at about 50° to 400° C. the poly(arylenedicarbonyl) polymer with a member of the group consisting of o-phenylenediamine, 3,3′,4,4′-tetraaminobiphenyl, and a mixture of o-phenylenediamine and 3,3′,4,4′-tetraaminobiphenyl to yield a resinous polyquinoxaline.

5. The process of claim 4 in which the dialdehyde of step 1 is dissolved in a water miscible organic solvent, the concentration of the dialdehyde in the solvent is within the range of about 5 to 20 percent by weight, the reducing agent is aqueous chromous sulfate, and the concentration of the reducing agent is within the range of about 0.1 to 2 molar; in step 2 the ratio of polymer to nitric acid is one part of polymer by weight to about 5 to 500 parts of nitric acid; the polycondensation step 3 is carried out in a solvent selected from the group consisting of (a) dipolar aprotic solvents and (b) an excess of a mixture of o-phenylenediamine and 3,3′,4,4′-tetraaminobiphenyl; and the ratio of the reactants in step 3 is 0 to about 100 moles of o-phenylenediamine and 0 to about 25 moles of 3,3′,4,4′-tetraaminobiphenyl per equivalent of —ArCOCO— in the poly(arylenedicarbonyl) polymer.

6. The process of claim 4 wherein the dialdehyde of step 1 is terephthaldehyde, the solvent is dioxane, the concentration of the terephthaldehyde in the dioxane is 8 to 12 percent by weight, the concentration of the reducing agent is 0.5 to 1.2 molar, and the reaction temperature is about 0° to 20° C.; in step 2 the ratio of polymer to nitric acid is about 10 to 100 parts of nitric acid per part of polymer and the reaction temperature is about 50° to 70° C.; the polycondensation step 3 is carried out at a temperature within the range of about 100° to 350° C., and the ratio of the reactants is 0 to about 20 moles of o-phenylenediamine and 0 to about 10 moles of 3,3′,4,4′-tetraaminobiphenyl per equivalent of —ArCOCO— in the poly(arylenedicarbonyl) polymer.

7. A process for preparing a resinous polyquinoxaline which comprises (1) reducing terephthaldehyde in solution in dioxane in an oxygen-free atmosphere with chromous sulfate at 0° to about 20° C. to form poly-[1,4-phenylene-bis(hydroxymethylene)]; (2) reacting the poly[1,4-phenylene-bis(hydroxymethylene)] with nitric acid at about 50° to 70° C. to form poly(1,4-phenylenedicarbonyl); and (3) polycondensing the poly(1,4-phenylenedicarbonyl) with o-phenylenediamine at about 100° to 350° C.

8. A process for preparing a resinous polyquinoxaline which comprises (1) reducing terephthaldehyde in solution in dioxane in an oxygen-free atmosphere with chromous sulfate at 0° to about 20° C.; (2) reacting the poly[1,4-phenylene-bis(hydroxymethylene)] with nitric acid at about 50° to 70° C.; and (3) polycondensing the product of step (2) with a mixture of o-phenylenediamine and 3,3′,4,4′-tetraaminobiphenyl at about 100° to 350° C.

9. A process for preparing a resinous polyquinoxaline which comprises (1) reducing terephthaldehyde in solution in dioxane in an oxygen-free atmosphere with chromous sulfate at 0° to about 20° C.; (2) reacting the poly[1,4-phenylene-bis(hydroxymethylene)] with nitric acid at about 50° to 70° C.; and (3) polycondensing the product of step (2) with 3,3′,4,4′-tetraaminobiphenyl at about 100° to 350° C.

References Cited

UNITED STATES PATENTS 3,086,019   4/1963   Moore et al. _____ 260—250

OTHER REFERENCES

Stille et al.: Journal Polymer Sci., Part A, vol. 2, 1964, pp. 3867–3875.

Jadmus et al.: Journal Polymer Sci., Part A–1, vol. 4, 1966, pp. 2831–2833.

Stille et al.: Journal Polymer Sci., Part B, vol. 4, 1966, pp. 39 and 665–667.

Yoda et al.: Journal Polymer Sci., Part B, vol. 4, 1966, p. 11.

Stille et al.: Journal Polymer Sci., Part B, vol. 5, 1967, pp. 989–992.

Lee et al.: New Linear Polymers, pp. 349–352, "Polyquinoxalines," McGraw-Hill.

WILLIAM SHORT, Primary Examiner

E. WOODBERRY, Assistant Examiner

U.S. Cl. X.R.

117—121, 124, 127; 161—198, 215, 257; 260—72.5